(12) United States Patent
Laster et al.

(10) Patent No.: US 11,435,427 B2
(45) Date of Patent: Sep. 6, 2022

(54) MARINE ELECTRONIC DEVICE FOR PRESENTMENT OF NAUTICAL CHARTS AND SONAR IMAGES

(71) Applicant: NAVICO HOLDING AS, Egersund (NO)

(72) Inventors: Matthew W. Laster, Broken Arrow, OK (US); Jeremiah Clark, Tulsa, OK (US); Lucas Steward, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 134 days.

(21) Appl. No.: 17/123,189

(22) Filed: Dec. 16, 2020

(65) Prior Publication Data
US 2021/0141048 A1 May 13, 2021

Related U.S. Application Data

(63) Continuation of application No. 15/982,362, filed on May 17, 2018, now Pat. No. 10,914,810.

(51) Int. Cl.
*G01S 3/801* (2006.01)
*G01S 3/802* (2006.01)
(Continued)

(52) U.S. Cl.
CPC .............. *G01S 3/801* (2013.01); *G01S 3/802* (2013.01); *G06F 3/0412* (2013.01);
(Continued)

(58) Field of Classification Search
CPC .......... G01S 3/801; G01S 3/802; G01S 15/86; G01S 15/96; G01S 7/6245; G01S 7/6272;
(Continued)

(56) References Cited

U.S. PATENT DOCUMENTS

| 7,355,924 B2 | 4/2008 | Zimmerman et al. |
| 8,940,312 B2 | 1/2015 | Hayashi et al. |

(Continued)

FOREIGN PATENT DOCUMENTS

| AU | 2019203322 A1 | 12/2019 | |
| AU | 2019203322 B2 * | 12/2020 | ......... G01S 15/8902 |

(Continued)

OTHER PUBLICATIONS

WASSP Multibeam; retrieved from <https://wassp.com/video/26/WASSP-S3-Demo-WEB.mp4> May 17, 2018.
(Continued)

*Primary Examiner* — Daniel Pihulic
(74) *Attorney, Agent, or Firm* — Nelson Mullins Riley & Scarborough LLP (57) ABSTRACT

An apparatus for providing marine information is provided including a user interface, a processor, and a memory including computer program code. The memory and the computer program code are configured to, with the processor, cause the apparatus to generate a sonar image based on sonar return data received from an underwater environment, determine a location associated with the sonar return data based on location data received from one or more position sensors, and render a nautical chart on a display. The computer program code is further configured to cause the apparatus to receive a user input on the user interface directed to a portion of the display in which the nautical chart is presented, and modify presentation of the nautical chart such that the portion of the display presents the sonar image in response to receiving the user input.

20 Claims, 10 Drawing Sheets

(51) Int. Cl.
*G06F 3/041* (2006.01)
*G06F 3/04845* (2022.01)
*G06F 3/0488* (2022.01)
*G09B 29/00* (2006.01)
*H04N 1/00* (2006.01)

(52) U.S. Cl.
CPC ........ *G06F 3/0488* (2013.01); *G06F 3/04845* (2013.01); *G09B 29/003* (2013.01); *H04N 1/00411* (2013.01)

(58) Field of Classification Search
CPC .... G01S 7/6281; G01S 7/629; G01S 15/8902; G06F 3/0412; G06F 3/04845; G06F 3/0488; G09B 29/003; H04N 1/00411
See application file for complete search history.

(56) References Cited

U.S. PATENT DOCUMENTS

| | | | |
|---|---|---|---|
| 9,739,884 B2 | 8/2017 | Proctor et al. | |
| 9,784,832 B2 | 10/2017 | Proctor et al. | |
| 9,840,312 B1 | 12/2017 | Clark | |
| 10,012,731 B2 | 7/2018 | Pelin et al. | |
| 10,311,715 B2* | 6/2019 | Jopling | G06F 3/0488 |
| 10,365,366 B2 | 7/2019 | Lauenstein | |
| 10,545,235 B2 | 1/2020 | Pelin et al. | |
| 10,914,810 B2* | 2/2021 | Laster | G06F 3/0412 |
| 11,249,176 B2* | 2/2022 | Hooper | G01S 15/89 |
| 2014/0013270 A1 | 1/2014 | Thomas et al. | |
| 2014/0013276 A1 | 1/2014 | Butterworth | |
| 2014/0071059 A1* | 3/2014 | Girault | B63B 49/00 345/173 |
| 2014/0096060 A1 | 4/2014 | Thomas et al. | |
| 2016/0061951 A1 | 3/2016 | Brown et al. | |
| 2016/0259049 A1 | 9/2016 | Proctor et al. | |
| 2016/0259050 A1 | 9/2016 | Proctor et al. | |
| 2016/0259051 A1 | 9/2016 | Proctor et al. | |
| 2016/0259052 A1 | 9/2016 | Kirmani et al. | |
| 2016/0306040 A1 | 10/2016 | Hunt et al. | |
| 2016/0341827 A1 | 11/2016 | Homer et al. | |
| 2017/0242113 A1 | 8/2017 | Lauenstein | |
| 2017/0363739 A1 | 12/2017 | Lauenstein | |
| 2019/0353744 A1 | 11/2019 | Laster et al. | |
| 2021/0141048 A1* | 5/2021 | Laster | G01S 3/801 |

FOREIGN PATENT DOCUMENTS

| | | | | |
|---|---|---|---|---|
| AU | 2019283811 B2 * | 9/2021 | ........... | G01C 21/203 |
| CA | 3042656 A1 * | 11/2019 | ........ | G01S 15/8902 |
| CA | 3042656 A1 | 11/2019 | | |
| EP | 3572837 A1 * | 11/2019 | ........ | G01S 15/8902 |
| EP | 3572837 A1 | 11/2019 | | |
| RU | 133285 U1 * | 10/2013 | | |
| WO | WO 1997/004334 A1 | 2/1997 | | |
| WO | WO 2018/201097 A2 | 11/2018 | | |

OTHER PUBLICATIONS

Ellison, Ben; Panbo; The Marine Electronics Hub; "Garmin BlueChart g2 & g2 Vision 2010, lots new?" Mar. 16, 2010; retrieved from <https://www.panbo.com/garmin-bluechart-g2-g2-vision-2010-lots-new>.

Ellison, Ben; Panbo; The Marine Electronics Hub; "Maptech i3 fishfinder road trip" Jun. 15, 2005; retrieved from <https://www.panbo.com/maptech-i3-fishfinder-road-trip>.

* cited by examiner

MARINE ELECTRONIC DEVICE FOR PRESENTMENT OF NAUTICAL CHARTS AND SONAR IMAGES

CROSS-REFERENCE TO RELATED APPLICATION(S)

This application is a continuation of U.S. Non-Provisional application Ser. No. 15/982,362, filed May 17, 2018, entitled "Marine Electronic Device for Presentment of Nautical Charts and Sonar Images"; the contents of which is hereby incorporated by reference in its entirety.

FIELD OF THE INVENTION

Embodiments of the present invention relate generally to marine electronic devices, and more particularly, to systems and apparatuses for presenting nautical charts and sonar images.

BACKGROUND OF THE INVENTION

Nautical charts including electronic or interactive nautical charts are typically used to provide a user with information about a body of water including (but not limited to) depth, routes, areas of interest, submerged objects, or the like. In some examples, nautical charts may also provide an indication of the location of a vessel associated with a chart display device. Further, some nautical charts may also display the location, course, speed, and/or other information for one or more other vessels on the body of water, such as provided by automatic identification system (AIS).

Sonar images utilize sonar data received from one or more transducers on a vessel to provide a "picture" of the underwater environment.

BRIEF SUMMARY OF THE INVENTION

A display panel can be used to present marine information (such as sonar images or nautical charts) to a user. For example, a display may present a sonar image and a nautical chart in a split screen format or one is selected and displayed at a given time. The distributed or binary display of the nautical chart and sonar image may result in a user consulting several displays and/or making several selections on a user interface to determine the surface and subsurface conditions of a body of water.

To understand the surface and submerged conditions of a body water, a user may consult a nautical chart and one or more sonar images. The nautical chart may be separate and unrelated to incoming sonar data collected by one or more sonar transducers. Since the nautical chart and sonar images are separate and not correlated, the user may have to determine or infer information between the nautical chart and the sonar images. It may be difficult and/or time consuming for the user to ascertain the condition of the body of water, which may detract from the commercial or recreational activities of the vessel.

In some example embodiments, the sonar image data may be correlated with location data associated with receipt of the sonar return. In this way, the sonar image data may be associated with corresponding location on the nautical chart. A user may then change a perspective on the display between the nautical chart and a sonar image associated with a particular location. For example, the user may zoom in on a location on the nautical chart. When a scale value for the chart reaches a predetermined scale value threshold, the display may shift to a sonar image associated with the location, or zoom through the chart into the sonar image.

In some embodiments, there may be a plurality of scale value thresholds, such as a first scale value threshold, which, when exceeded, causes a first sonar image, such as a sidescan sonar image to be overlaid on the nautical chart. A second scale value threshold may shift the displayed perspective between the nautical chart including the sidescan sonar image overlay and a second sonar image, such as a 2D downscan image, 3D sonar image, 2D live sonar image, 3D live sonar image, or the like. In some instances, the location may be associated with a vessel's current location, causing a current or live sonar image to be displayed. However, in other instances the selected location may be remote from the vessel and, if available, a stored sonar image may be rendered, such as previously generated by the vessel or another vessel and stored in a commonly accessible storage location.

In some embodiments, the user interface may change perspectives between the nautical chart and the sonar image based on panning a display angle. For example, a horizon, such as a waterline may be disposed between the nautical chart and the sonar data. A user may drag the horizon up to shift the displayed perspective to the sonar image and drag the horizon down to shift the displayed perspective to the nautical chart. A user may shift the perspective completely to the sonar image or nautical chart, or may shift the perspective to an intermediate state showing both the sonar data and the nautical chart. In some example embodiments, the perspective shift may be anchored to the vessel position or a selected location, such that the sonar image and nautical chart are correlated by location. Panning of the perspective of the rendered nautical chart and sonar image may provide an intuitive user interface, particularly in an instance in which the sonar image and nautical chart are three-dimensional.

In an example embodiment, an apparatus for providing marine information is provided including a user interface, a processor, and a memory including computer program code. The memory and the computer program code are configured to, with the processor, cause the apparatus to generate a sonar image based on sonar return data received from an underwater environment relative to a vessel, determine a location associated with the sonar return data based on location data received from one or more position sensors at an instance in which the sonar return data was received by one or more transducers associated with the vessel, present a nautical chart on a display, receive a user input on the user interface directed to a portion of the display in which the nautical chart is presented, and modify, in response to receiving the user input, presentation of the nautical chart such that the portion of the display presents the sonar image.

In some example embodiments, the memory and the computer program code are further configured to, with the processor, cause the apparatus to present the nautical chart on the display from a first perspective and cause, in response to receiving the user input, presentation of a shifting from the first perspective to a second perspective on the portion of the display. The second perspective includes presentation of at least a portion of the sonar image. In an example embodiment, the nautical chart includes a three-dimensional nautical chart, the sonar image includes a three-dimensional sonar image, a waterline is positioned between the nautical chart and the sonar image during presentation of the shifting, and the user input includes a touch input at a first point on the portion of the display at or above the waterline, dragging the waterline to a second point that is vertically above the first point on the portion of the display, and releasing the touch input.

In some example embodiments, the user input includes a touch input by the user at a first point on the portion of the display and dragging of the touch input to a second point on the portion of the display. In an example embodiment, the first point is associated with a nautical chart horizon. In some example embodiments, the first point is associated with a perspective icon.

In an example embodiment, the user input defines a desired zoom level.

In some example embodiments, the sonar image includes a three dimensional sonar image.

In an example embodiment, the nautical chart includes automatic identification system (AIS) data.

In some example embodiments, the memory and the computer program code are further configured to, with processor, cause the apparatus to render a sonar image overlay over the nautical chart at a location associated with the sonar return data in response to the scale of the chart satisfying a predetermined scale and remove the sonar image overlay in response to the scale of the nautical chart exceeding the predetermined scale. In an example embodiment, the sonar image overlay includes a sidescan sonar image.

Additional example embodiments of the present invention include methods, systems, and computer program products associated with various embodiments described herein, including, for example, the above described apparatus embodiments.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Example Watercraft

Figure 1:
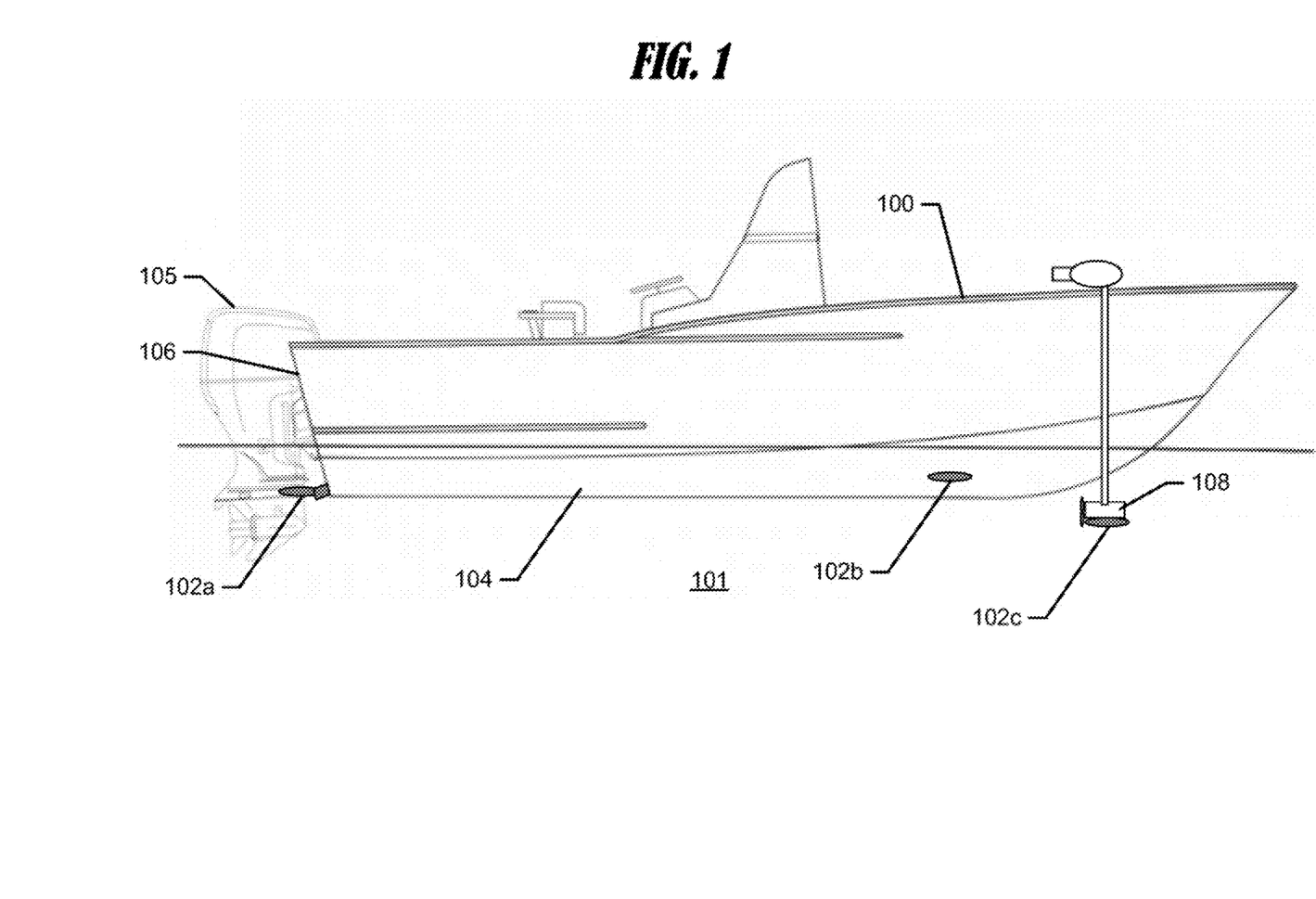
FIG. 1 illustrates an example vessel including various sonar transducer assemblies, in accordance with some embodiments discussed herein.

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar return signals from the body of water, and convert the sonar return signals into sonar return data.

One or more sonar beams may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be a transducer array, e.g. a "phased array." The transducer array may include a plurality of transducer elements arranged on a printed circuit board (PCB). The PCB may mechanically support and electrically connect the electronic components, including the transducer elements using conductive tracks (e.g. traces), pads, and other features. The conductive tracks may comprise sets of traces, for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g. sonar beams, into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes (or sonar return signals) may strike the transmitting transducer element and/or a separate one or more sonar receiver elements, which convert the echoes back into an electrical signal which is processed by a processor (e.g., processing circuity 407 as discussed in reference to FIG. 2) and sent to a display (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to produce a sonar image representing the underwater environment.

In an example embodiment, the one or more transducer assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a three-dimensional position of the sonar return signals (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging", published as US 2016/0341827, and U.S. Pat. No. 9,739,884, entitled Systems and Associated Methods for Producing a 3D Sonar Image," both of which are assigned to the Assignee of the present application and are hereby incorporated by reference herein in their entireties.

In an example embodiment, a vessel 100 may include a main propulsion motor 105, such as an outboard or inboard motor. Additionally, the vessel 100 may include trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

Example Architecture

Figure 2:
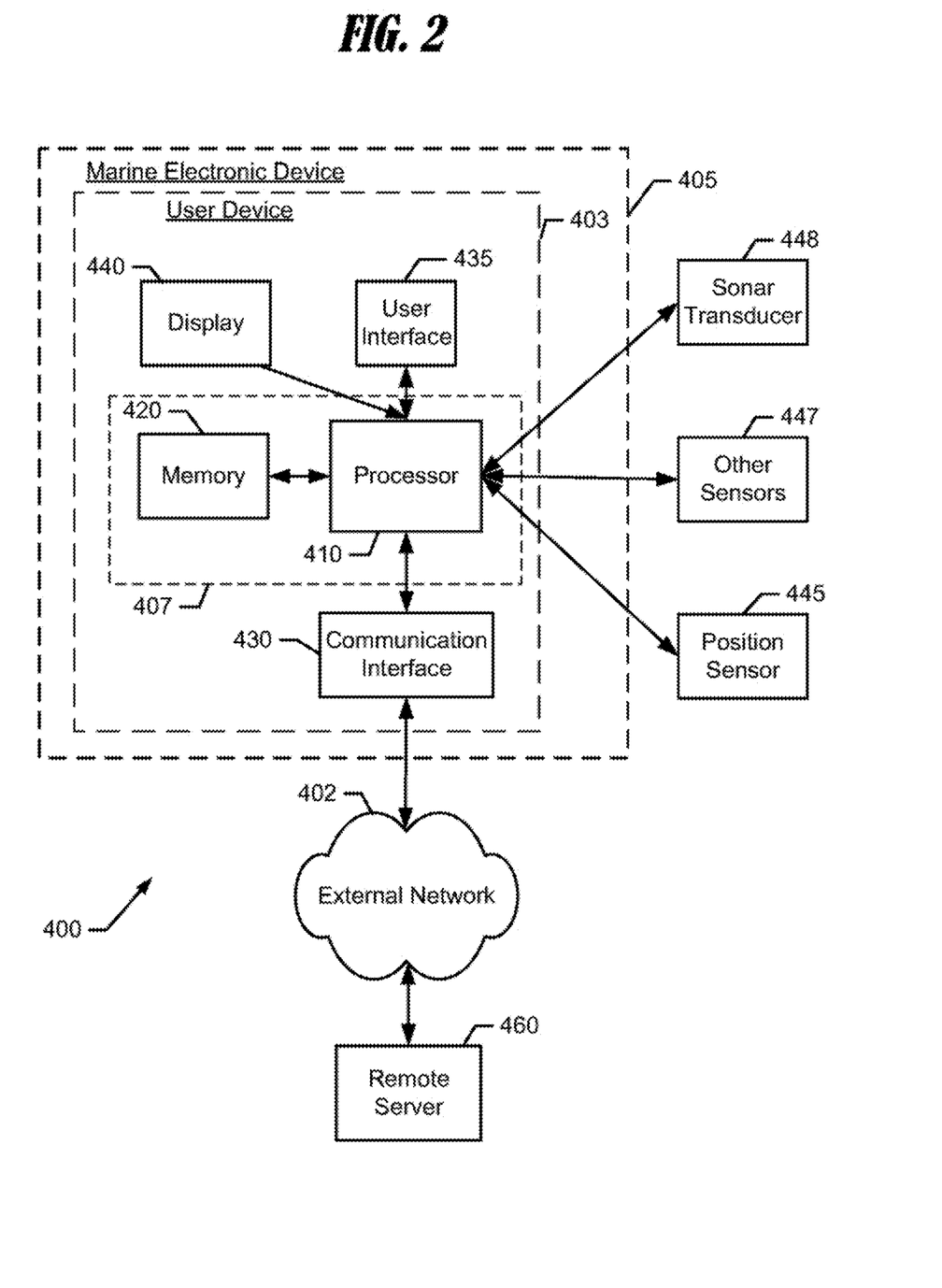
FIG. 2 illustrates a block diagram of an example marine electronic system, in accordance with some example embodiments discussed herein.

FIG. 2 shows a block diagram of an example computing device, such as user device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine data system 400.

The marine electronic device 405 may include a processor 410, a memory 420, a user interface 435, a display 440, and a communication interface 430. Additionally, the marine electronic device 405 may include or otherwise be in communication with one or more sensors (e.g. position sensor 445, other sensors 447, etc.) and/or one or more sonar transducers 448.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data. Additionally, the processor may be configured to present a nautical chart correlated to the sonar images and/or shift/modify the perspective of the sonar image and nautical chart in response to a user input.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit or receive data, such as sonar signals, sonar returns, sonar image data or the like to or from a sonar transducer 448. In some embodiments, the marine electronic device may also be configured to communicate with a propulsion system of the vessel 100. The marine electronic device may receive data indicative of operation of the propulsion system, such as engine or trolling motor running, running speed, or the like.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 2 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The sonar transducer 448, such as transducer assemblies 102a, 102b, and 102c, may be housed in a trolling motor housing, attached to the vessel 100 or, in some cases, be castable or otherwise remote. The sonar transducer 448 may be configured to gather sonar return signals, e.g. sonar returns, from the underwater environment relative to the vessel 100. Accordingly, the processor 410 may be configured to receive the sonar return data from the sonar transducer 448, process the sonar return data to generate an image including a sonar image based on the gathered sonar return data. In some embodiments, the marine electronic device 405 may be used to determine depth and bottom contours, detect fish, locate wreckage, etc. In this regard, sonar beams or pulses from a sonar transducer 448 can be transmitted into the underwater environment. The sonar signals reflect off objects in the underwater environment (e.g. fish, structure, sea floor bottom, etc.) and return to the transducer assembly, which converts the sonar returns into sonar return data that can be used to produce a sonar image of the underwater environment.

Example User Interface Displays

FIGS. 3-8 illustrate various rendering (e.g., presentation) of sonar images and/or nautical charts on a user interface display, such as display 440 as referenced in FIG. 2. Also referencing FIG. 2, the processing circuitry 407 may be configured to receive location data from the position sensor 445, such as a global positioning system (GPS) sensor. The processing circuitry 407 may determine a location, e.g. geographical location, based on the location data and correlate the geographic location with a corresponding chart location in the nautical chart. The processing circuitry 407 may render the nautical chart 302 on display 440, which may include an indication of a vessel location 306 in an instance in which the displayed portion of the nautical chart 302 includes the chart location associated with the determined geographical location. Chart data associated with the nautical chart 302 may be stored in a memory, such as the memory 420 or remote server 460, from which the processing circuitry 407 may retrieve the chart data as necessary for rendering to the display 440.

The processing circuitry 407 may also be configured to receive sonar return data in response to the one or more sonar signals being transmitted into the body of water 101. As discussed above, the processing circuitry 407 may be configured to generate one or more sonar images based on the one or more sonar returns. The processing circuitry 407 may determine a location associated with the sonar return data based on location data received by the position sensor 445 at the time in which the sonar return data was received by the one or more transducer assemblies 102a, 102b, 102c. The processing circuitry 407 may be configured to correlate the sonar return data and/or the location data in real time such as by adding location data to the sonar return data and/or sonar image data, or by correlation of time stamps included in the location data and the sonar return data or sonar images. The sonar images may include, without limitation, sidescan 2D sonar images, 3D downscan sonar images, 3D sonar images, 2D and/or 3D live (e.g. real time or near real time) sonar images, or the like. The processing circuitry 407 may be configured to render the sonar images on the display 440 in real time or near real time, and/or store the sonar images and corresponding location information in a memory, such as the memory 420 or the remote server 460.

Figure 3:
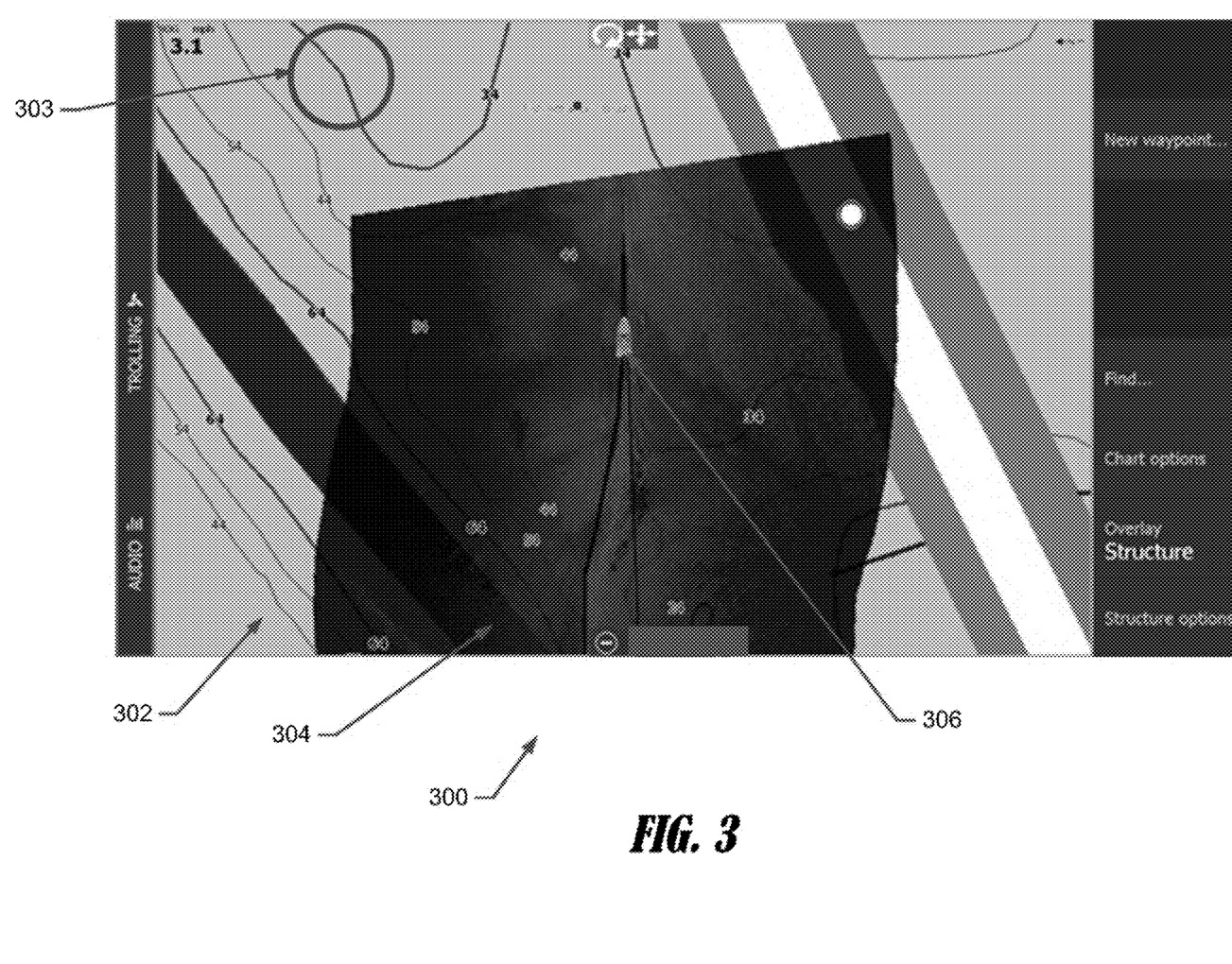
FIG. 3 illustrates an example 2D nautical chart with sonar image overlay, in accordance with some embodiments discussed herein.

The nautical chart 302 may be a 2D or 3D nautical chart that may be rendered or presented at a plurality of scale or zoom levels. In some embodiments, as the scale value increases with decreasing zoom levels, fewer details of the chart data may be displayed in the nautical chart 302. Similarly, in some such embodiments, as the scale value decreases with the increasing zoom level, more details of the chart data may be rendered in the nautical chart 302. The processing circuitry 407 may adjust the zoom level based on user inputs (e.g., gesture user inputs) on the user interface 435. Some example user inputs include touching or selecting an increase or decrease icon, rolling or dragging a zoom dial in a first or second direction, pinch open or pinch close, entering a scale value, or any other suitable method of defining a zoom level. As discussed above, the user interface 435 may include one or more interface devices, such as a mouse, trackball, joystick or the like, which may be used to control a cursor on the display 440 and to make selections. Additionally or alternatively, the user interface 435 may include a touch screen, such that touch input and/or gestures on the touch screen are used to provide user input.

Figure 4:
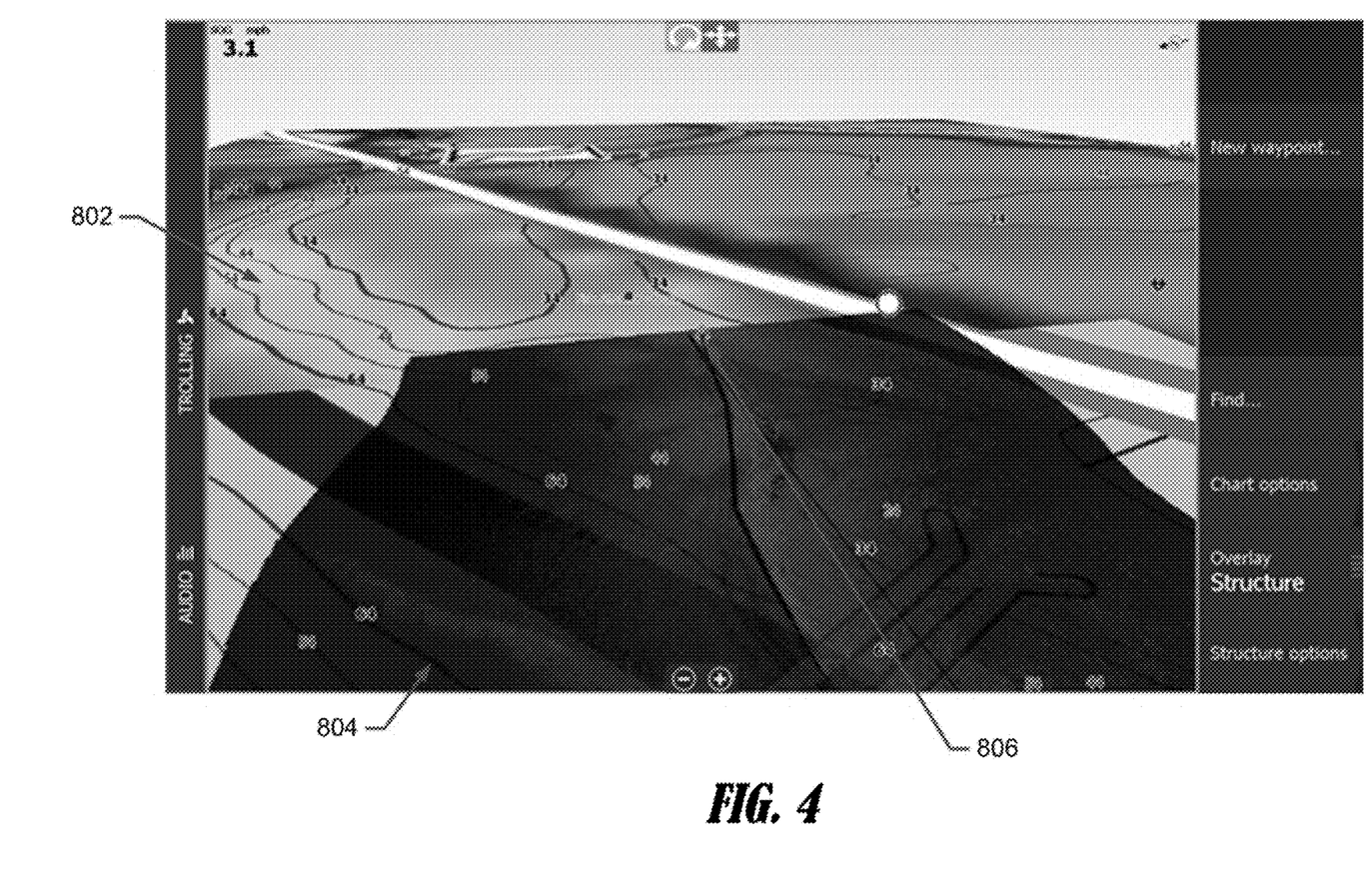
FIG. 4 illustrates an example 3D nautical chart with sonar image overlay, in accordance with some embodiments discussed herein.

In some example embodiments, sidescan sonar images or other suitable sonar images may be overlaid on the nautical chart 302, as a sonar image overlay 304. FIG. 3 illustrates a sonar image overlay 304 over a 2D nautical chart 302. The sonar image overlay 304 may be overlaid onto the nautical chart 302 based on the location associated with the sonar image, such that the geographical location of the sonar image data is aligned with the corresponding location in the nautical chart 302. The processing circuitry 407 may be configured to display real time or near real time sonar images as the sonar image overlay 304 in response to the nautical chart 302 including the vessel location 306. Additionally or alternatively, the processing circuitry 407 may be configured to render historical or stored sonar images as the sonar image overlay 304, such as if no sonar images are available for the vessel location 306 or if the rendering of nautical chart 302 is zoomed in on a remote location 303 separate from the vessel location 306. FIG. 4 depicts another rendering including a 3D nautical chart 802 with a sidescan sonar image overlay 804 which includes a vessel location 806.

In some embodiments, sonar image data may be linked to a threshold zoom level or scale value. For example, sidescan sonar images or other suitable sonar images may be overlaid on the nautical chart 302 when the scale value satisfies a predetermined scale value threshold, such as 700 ft/unit, 500 ft/unit, or any other suitable scale value based on the display, sonar image, or the like. In response to the scale value exceeding the predetermined scale value, the processing circuitry 407 may be configured to remove the sonar image overlay 304.

In an example embodiment, the nautical chart may include navigational information for one or more vessels, such as name, position, course, speed, expected routes, or the like. The navigational information may be provided by an automatic identification system (AIS). The navigational information may always be displayed on the nautical chart 302, may be selectively displayed on the nautical chart 302, or, similar to the sonar image overlay 304, may be added or removed based on a second predetermined scale value. For example, the processing circuitry 407 may remove the navigational information from the nautical chart when the scale value satisfies a predetermined scale value threshold, such as 200 ft/unit, or other suitable scale value. The processing circuitry 407 may render the navigational information on the nautical chart 302 in response to exceeding the predetermined scale value threshold.

Figure 5:
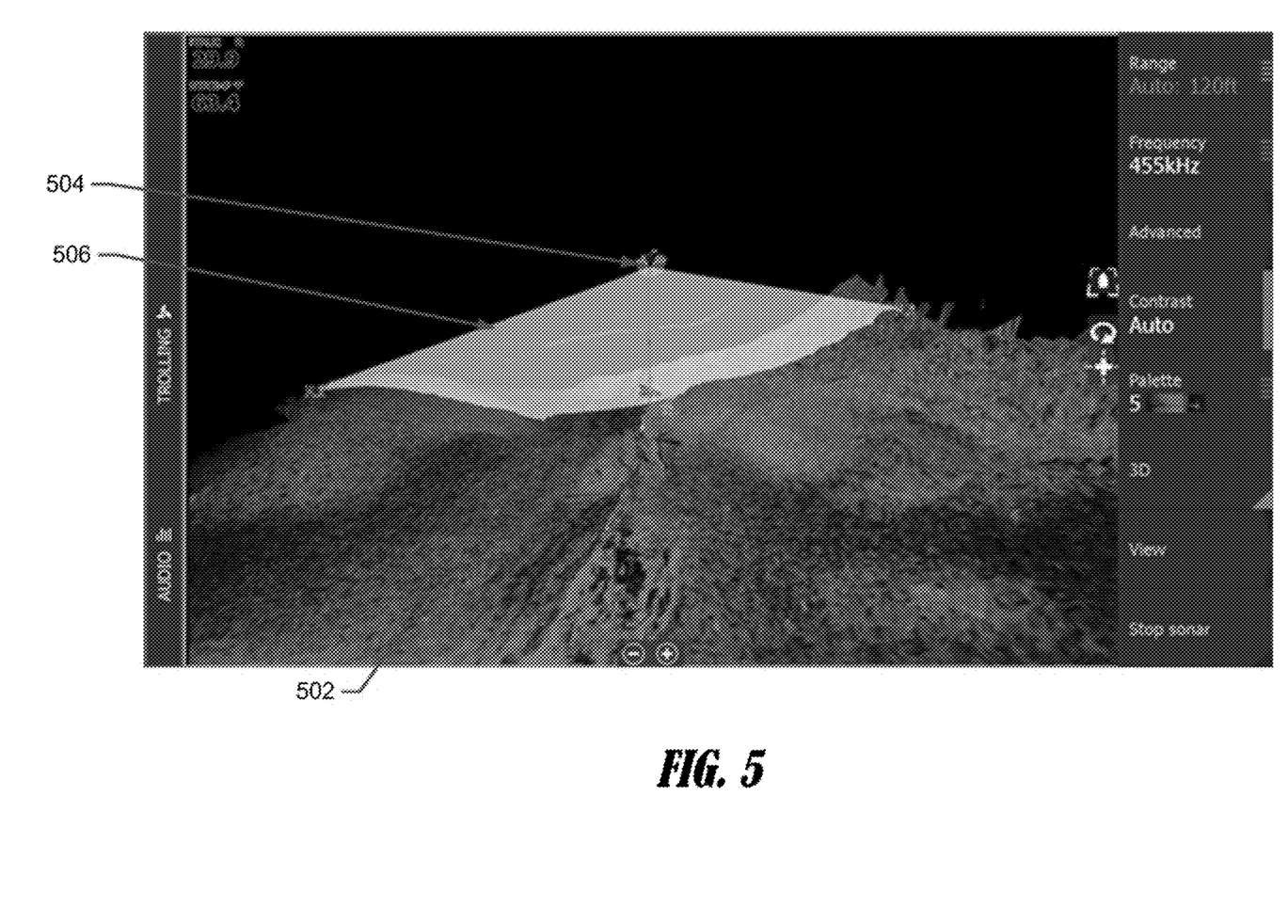
FIG. 5 illustrates an example 3D sonar image, in accordance with some embodiments discussed herein.
Figure 6:
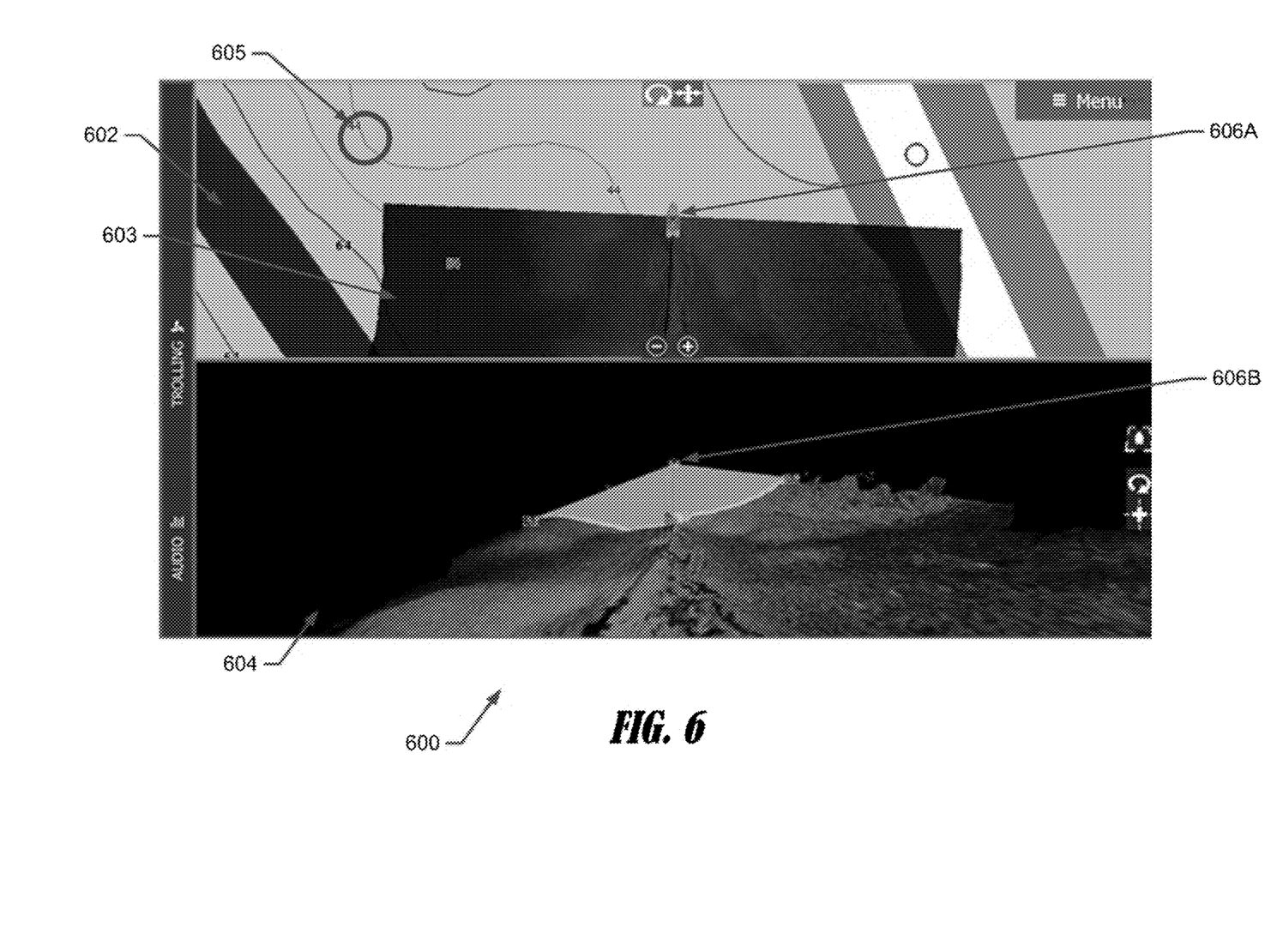
FIG. 6 illustrates an example nautical chart and sonar image in a split screen view, in accordance with some example embodiments discussed herein.
Figure 7A:
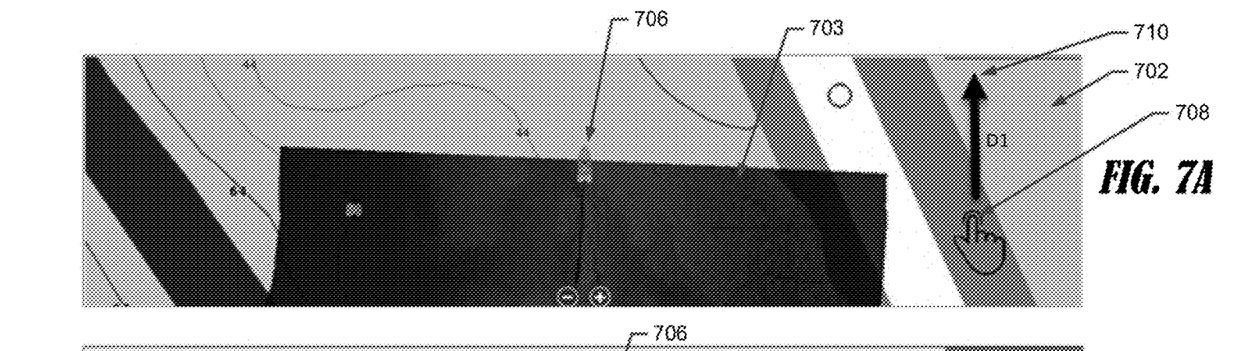
FIGS. 7A-7E illustrate an example change of perspective between a nautical chart and a sonar image according to some embodiments discussed herein.
Figure 7B:
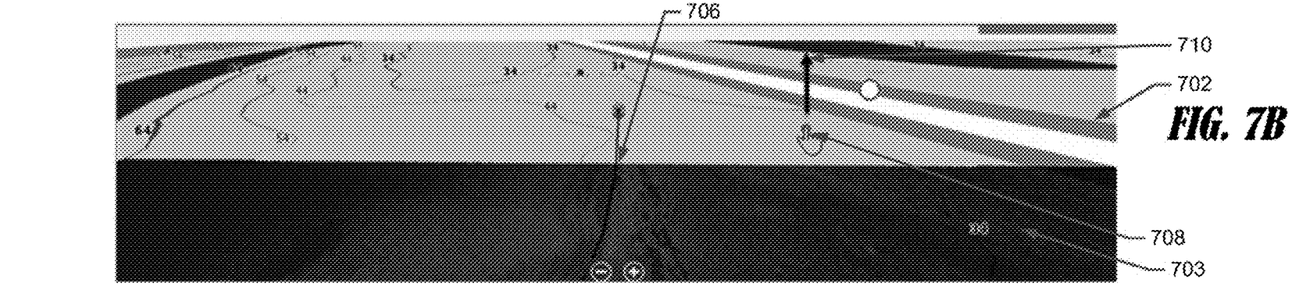
Figure 7C:
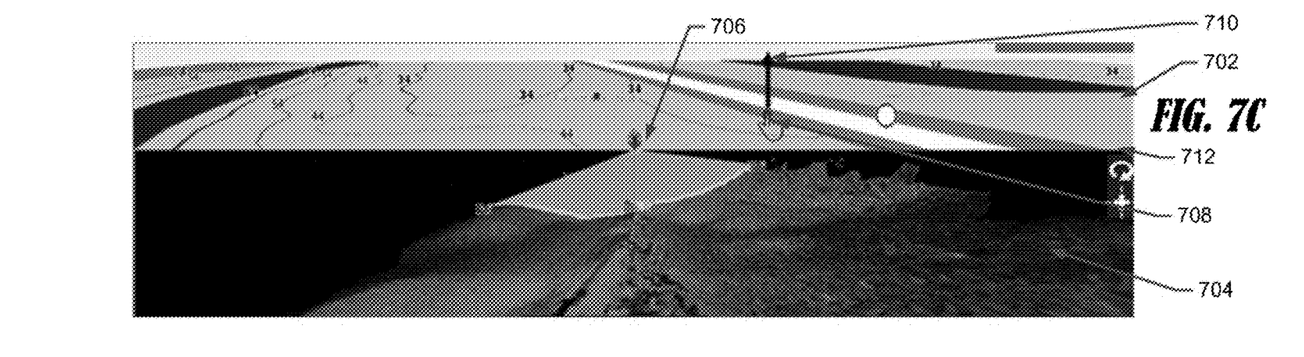
Figure 7D:
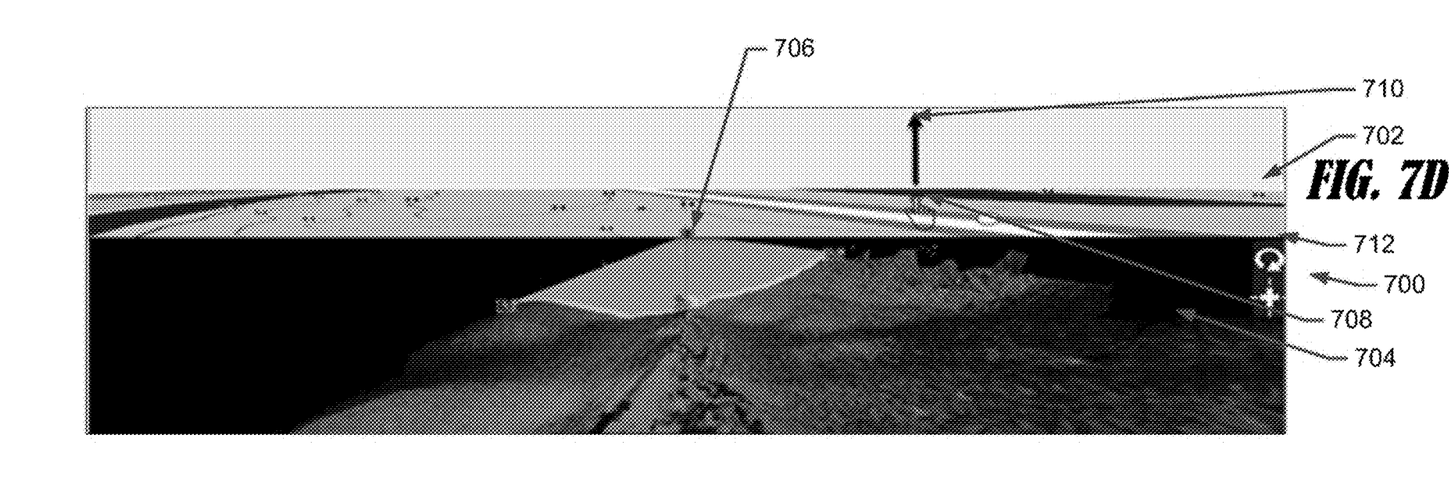
Figure 7E:
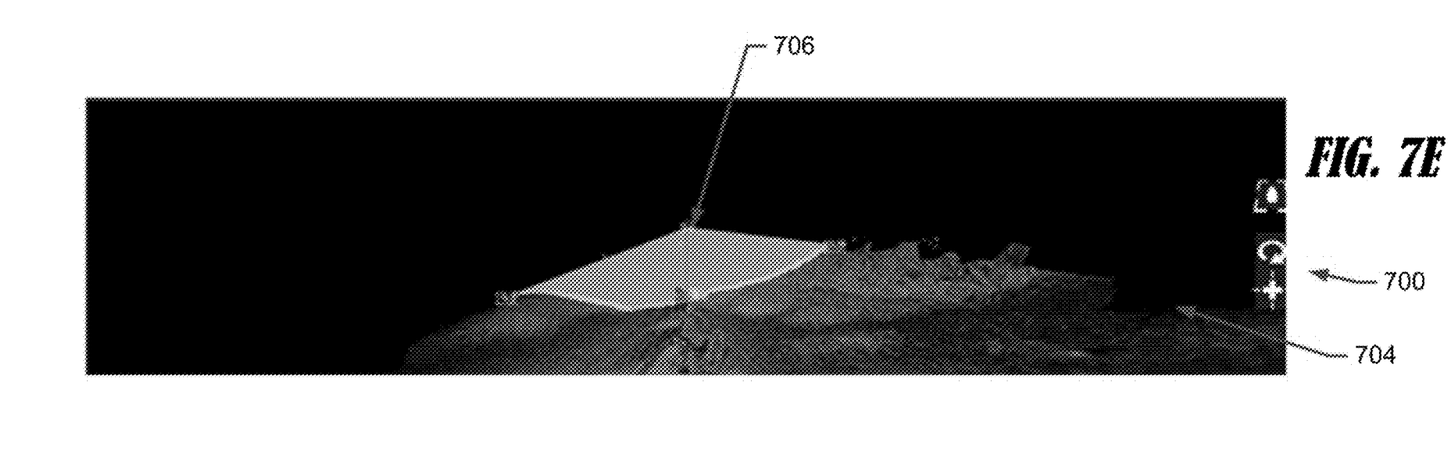

Turning to FIG. 5, the processing circuitry 407 may also be configured to render a sonar image 502, such as the depicted 3D sonar image. The sonar image 502 may include a vessel location, and in some instances an indication of a projected beam pattern 506. FIG. 6 depicts an example split screen view 600 including both a nautical chart 602 with a sonar image overlay 603 and a sonar image 604. The depicted sonar image overlay 603 is a sidescan sonar image and the sonar image 604 is a 3D structural scan image. Each of the nautical chart 602, sonar image overlay 603, and sonar image 604 may include a vessel location 606A, 606B. The processing circuitry 407 may align the nautical chart 602 and/or the sonar image overlay 603 with the sonar image 604 based on the vessel location 606 or other location identified in both the nautical chart and sonar image, such that each half of the split screen view is rendering information corresponding to the same location.

In some example embodiments, the processing circuitry 407 may be configured change a presentation on the display 440 from the nautical chart 602 to the sonar image 604 and back based on a further scale value threshold, such as a smallest available scale value. In such an embodiment, processing circuitry 407 may present the nautical chart 602 and then modify the presentation of the nautical chart such that at least a portion of the sonar image 304 is presented, such as rendering the split screen view 600 or rendering only the sonar image 604, as the zoom level is increased through the predetermined scale value threshold. As presented on the display 440, it may appear that the display has "zoomed through" the nautical chart 602 into the sonar image 604. The processing circuitry 407 may reverse the process in response to the zoom level decreasing, causing the scale value to increase to satisfy the further predetermined scale value threshold.

Although the depicted sonar image 604 correlated with the vessel location 606B, e.g. real time or near real time sonar images, the processing circuitry 407 may also render sonar images in response to zooming in at a remote location 605 separate from the vessel location 606A in the nautical chart 602. The processing circuitry 407 may render historical or stored sonar images from a memory, such as the memory 420 or the remote server 460. Additionally or alternatively, the processing circuitry 407 may render real time or near real time sonar images based on sonar returns collected by a different vessel or a remote sonar transducer. For example, a sonar transducer, such as on a buoy, a probe, or a remote vessel may collect sonar returns and/or generate sonar image data, which may be transmitted to one or more other devices, including the marine electronic device 405 via the external network 402. The processing circuitry 407 may render the remotely collected sonar images based on the zoom level satisfying the predetermined scale value threshold and the location associated zoomed in portion of the nautical chart 302, as discussed above.

Turning to FIGS. 7A-E, the processing circuitry 407 may change the perspective between a nautical chart 702 (which is currently showing sonar image overlay 703) and a sonar image 704 based on "panning" or "dragging" the perspective. Similar to FIG. 4, the nautical chart 702 is a 3D nautical chart and the sonar image 704 is a 3D sonar image. The processing circuitry 407 may receive a user input selecting a first point 708 including a portion of the display associated with the nautical chart 702, such as by selecting a cursor position or touching the screen, and dragging the selected point to a second point 710 on the display 440 and releasing the input, such as an upward vertical swipe indicated by arrow D1. As depicted in FIGS. 7A-D, the perspective of the rendering shifts from first perspective of the nautical chart 702 to a second perspective of the sonar image 704. Similarly, the perspective of the presentation may shift from the sonar image 704 to the nautical chart 702 in response to a second user input, such as selecting third point including a portion of the display associated with the sonar image 704 and dragging the selected point to a fourth point on the display and releasing, such as a downward vertical swipe.

In some embodiments, the point of rotation of the images may be about the vessel location 706. The nautical chart 702 and sonar image 704 may include a waterline, which may be positioned and define a horizon 712 between the nautical chart 702 and the sonar image 704. Although, the depicted perspective shift is between a 3D nautical chart and a 3D sonar image, similar modifications of the presentation may be performed on any combination of 2D and/or 3D nautical charts and sonar images, as would be understood by one of ordinary skill in the art.

Figure 8:
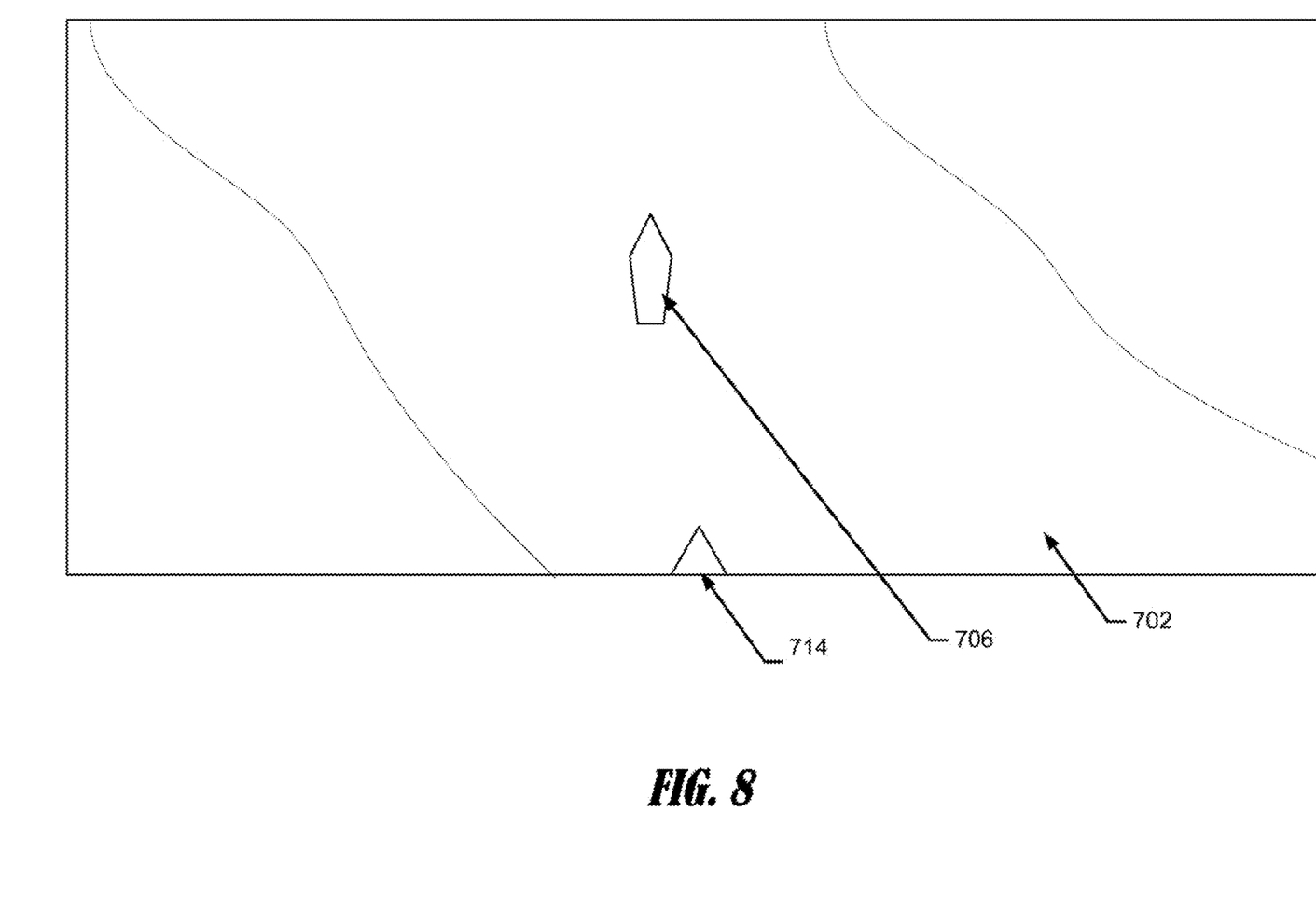
FIG. 8 illustrates an example nautical chart with a perspective icon in accordance with some embodiments discussed herein.

In an example embodiment, the first point may be a portion of the horizon 712, for example the bottom of the display 440 when only the nautical chart 702 is displayed, the top of the display 440 when only the sonar image 704 is displayed, or the horizon 712 between the nautical chart 702 and the sonar image 704. In some example embodiments, the processing circuitry 407 may render a perspective icon 714, as depicted in FIG. 8. The first point or third point may include the perspective icon 714, such that dragging a point starting in the perspective icon 714 may cause the processing circuitry 407 to shift the perspective of the display 440 between the nautical chart 702 and the sonar image 704. In some example embodiments, dragging a point that is not associated with the horizon 712 or the perspective icon may rotate the perspective within the nautical chart 702 and/or sonar image 704, without shifting between the nautical chart 702 and the sonar image 704.

This rendering of the nautical image 602 locationally-aligned with the sonar image 604 and/or a sonar image overlay 603 may make understanding of the condition of the body of water including, but not limited to, surface conditions, such as other vessels, and subsurface conditions, such as depth, objects, fish, or the like, intuitive and thereby substantially easier for an operator to understand.

Example Flowchart(s) and Operations

Embodiments of the present invention provide methods, apparatus and computer program products for controlling presentation of nautical charts and/or sonar images. Various examples of the operations performed in accordance with embodiments of the present invention will now be provided with reference to FIG. 9.

Figure 9:
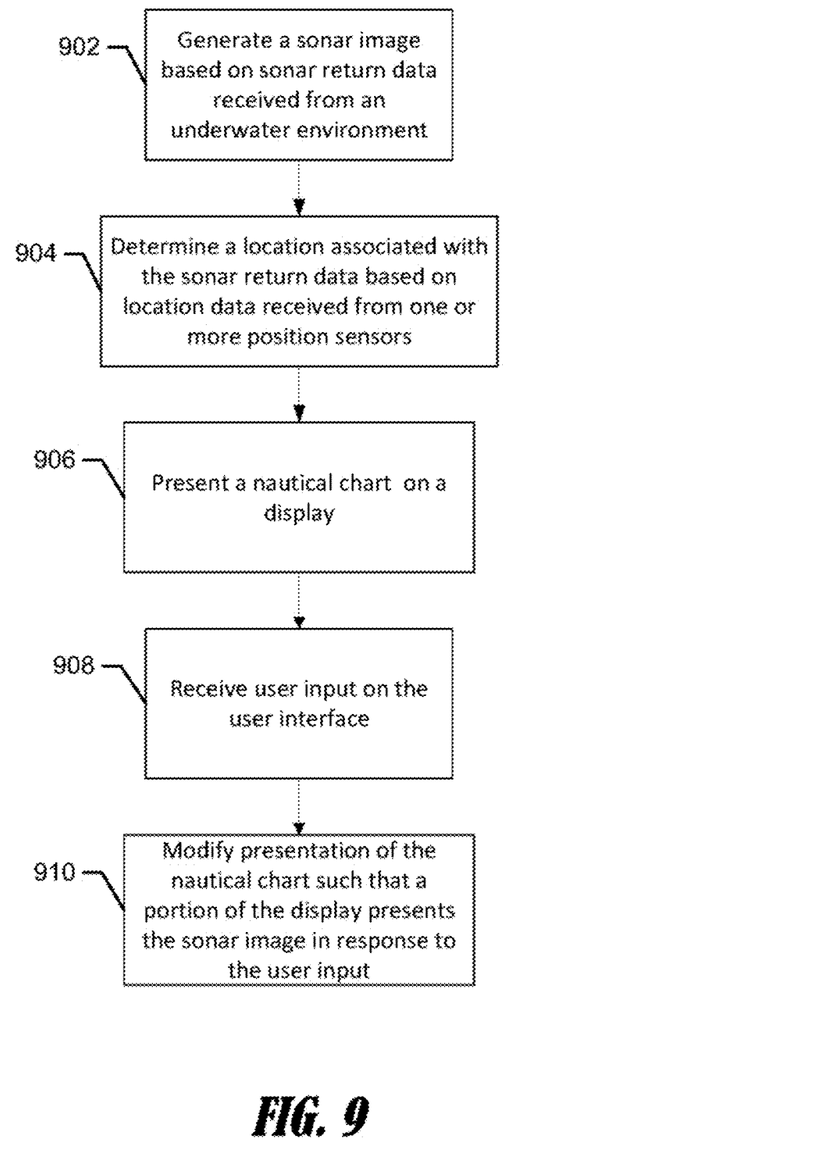
FIG. 9 illustrates a flowchart of example methods of controlling presentation of nautical charts and/or sonar images according to some embodiments discussed herein.

FIG. 9 illustrates a flowchart according to example methods for controlling presentation of nautical charts and/or sonar images according to an example embodiment. The operations illustrated in and described with respect to FIG. 9 may, for example, be performed by, with the assistance of, and/or under the control of one or more of the processor 410, memory 420, communication interface 430, user interface 435, position sensor 445, other sensor 447, display 440, and/or sonar transducers 448.

The method may include generating a sonar image based on sonar return data received from an underwater environment at operation 902, determining a location associated with the sonar return data based on location data received from one or more position sensors at operation 904, present a nautical chart on a display at operation 906, receive a first gesture user input at operation 908, and modify presentation of the nautical chart such that a portion of the display presents the sonar image in response to the first gesture user input at operation 910.

FIG. 9 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. An apparatus for providing marine information, the apparatus comprising:
    a user interface;
    a processor; and
    a memory including computer program code, the memory and the computer program code configured to, with the processor, cause the apparatus to:
        generate a sonar image based on sonar return data received at a geographic location from an underwater environment relative to a vessel, wherein the sonar image is associated with a scale value;

determine the geographic location associated with the sonar return data based on location data received from one or more position sensors at an instance in which the sonar return data was received by one or more transducers associated with the vessel;

present a nautical chart on a display;

receive a user input via the user interface within a portion of the display in which the nautical chart is presented such that the user input corresponds to the geographic location within the nautical chart, wherein the user input indicates a desire to increase a zoom level of the nautical chart to or past the scale value; and cause, in response to at least one of receiving the user input or changing the zoom level of the nautical chart to or past the scale value, presentation of the sonar image in relative position on the display with respect to the nautical chart, wherein the relative position corresponds to the geographic location within the nautical chart.

2. The apparatus of claim 1, wherein the nautical chart comprises a three-dimensional nautical chart, wherein the sonar image comprises a three-dimensional sonar image, wherein a waterline is positioned between the nautical chart and the sonar image during presentation.

3. The apparatus of claim 1, wherein the memory and the computer program code are further configured to, with the processor, cause the apparatus to cause presentation of the sonar image in the relative position on the display with respect to the nautical chart by causing presentation of the sonar image as an overlay over the nautical chart at the relative position.

4. The apparatus of claim 3, wherein the memory and the computer program code are further configured to, with the processor, cause the apparatus to:

receive a second user input via the user interface within the portion of the display in which the nautical chart is presented, wherein the second user input indicates a desire to decrease the zoom level of the nautical chart above the scale value; and cause, in response to at least one of receiving the second user input or changing the zoom level of the nautical chart above the scale value, removal of presentation of the sonar image overlay from over the nautical chart.

5. The apparatus of claim 1, wherein the sonar image is a first sonar image and the scale value associated with the first sonar image is a first scale value, and wherein the memory and the computer program code are further configured to, with the processor, cause the apparatus to:

generate a second sonar image based on second sonar return data received at the geographic location from the underwater environment relative to the vessel, wherein the second sonar image is associated with a second scale value, wherein the second scale value corresponds to a greater zoom level of the nautical chart than the first scale value, wherein the second sonar image is associated with the same geographic location as associated with the first sonar image, wherein the second sonar image is different than the first sonar image;

receive a second user input via the user interface within the portion of the display in which the nautical chart is presented, wherein the second user input indicates a desire to increase the zoom level of the nautical chart to or past the second scale value; and cause, in response to at least one of receiving the second user input or changing the zoom level of the nautical chart to or past the second scale value, presentation of the second sonar image in a second relative position on the display with respect to the nautical chart, wherein the second relative position corresponds to the geographic location within the nautical chart.

6. The apparatus of claim 5, wherein the memory and the computer program code are further configured to, with the processor, cause the apparatus to:

cause, in response to at least one of receiving the second user input or changing the zoom level of the nautical chart to or past the second scale value, removal of presentation of the first sonar image.

7. The apparatus of claim 5, wherein the memory and the computer program code are further configured to, with the processor, cause the apparatus to:

cause presentation of the first sonar image in the relative position on the display with respect to the nautical chart by causing presentation of the first sonar image as an overlay over the nautical chart at the relative position; and cause presentation of the second sonar image in the second relative position on the display with respect to the nautical chart by causing presentation of the second sonar image below the nautical chart at the second relative position.

8. The apparatus of claim 7, wherein the second sonar image is a downward sonar image.

9. The apparatus of claim 7, wherein the second sonar image is a forward sonar image.

10. The apparatus of claim 7, wherein the second sonar image is a three-dimensional sonar image.

11. The apparatus of claim 7, wherein the memory and the computer program code are further configured to, with the processor, cause the apparatus to cause presentation of the second sonar image in the second relative position on the display with respect to the nautical chart by further causing a shifting of perspective of the presentation of the nautical chart.

12. The apparatus of claim 1, wherein the nautical chart comprises automatic identification system (AIS) data.

13. A method for providing marine information on a marine electronic device, the method comprising:

generating, by a processor of the marine electronic device, a sonar image based on sonar return data received at a geographic location from an underwater environment relative to a vessel, wherein the sonar image is associated with a scale value;

determining the geographic location associated with the sonar return data based on location data received from one or more position sensors at an instance in which the sonar return data was received by one or more transducers associated with the vessel;

presenting a nautical chart on a display;

receiving a user input via the user interface within a portion of the display in which the nautical chart is presented such that the user input corresponds to the geographic location within the nautical chart, wherein the user input indicates a desire to increase a zoom level of the nautical chart to or past the scale value; and causing, in response to at least one of receiving the user input or changing the zoom level of the nautical chart to or past the scale value, presentation of the sonar image in relative position on the display with respect to the nautical chart, wherein the relative position corresponds to the geographic location within the nautical chart.

14. The method of claim 13, wherein causing presentation of the sonar image in the relative position comprises causing presentation of the sonar image as an overlay over the nautical chart at the relative position.

15. The method of claim 14 further comprising:
receiving a second user input via the user interface within the portion of the display in which the nautical chart is presented, wherein the second user input indicates a desire to decrease the zoom level of the nautical chart above the scale value; and
causing, in response to at least one of receiving the second user input or changing the zoom level of the nautical chart above the scale value, removal of presentation of the sonar image overlay from over the nautical chart.

16. The method of claim 13, wherein the sonar image is a first sonar image and the scale value associated with the first sonar image is a first scale value, and wherein the method further comprises:
generating a second sonar image based on second sonar return data received at the geographic location from the underwater environment relative to the vessel, wherein the second sonar image is associated with a second scale value, wherein the second scale value corresponds to a greater zoom level of the nautical chart than the first scale value, wherein the second sonar image is associated with the same geographic location as associated with the first sonar image, wherein the second sonar image is different than the first sonar image;
receiving a second user input via the user interface within the portion of the display in which the nautical chart is presented, wherein the second user input indicates a desire to increase the zoom level of the nautical chart to or past the second scale value; and
causing, in response to at least one of receiving the second user input or changing the zoom level of the nautical chart to or past the second scale value, presentation of the second sonar image in a second relative position on the display with respect to the nautical chart, wherein the second relative position corresponds to the geographic location within the nautical chart.

17. The method of claim 16 further comprising:
causing presentation of the first sonar image in the relative position on the display with respect to the nautical chart by causing presentation of the first sonar image as an overlay over the nautical chart at the relative position; and
causing presentation of the second sonar image in the second relative position on the display with respect to the nautical chart by causing presentation of the second sonar image below the nautical chart at the second relative position.

18. The method of claim 17 further comprising causing presentation of the second sonar image in the second relative position on the display with respect to the nautical chart by further causing a shifting of perspective of the presentation of the nautical chart.

19. A system comprising:
one or more sonar transducers configured to receive sonar return data from an underwater environment relative to a vessel; and
a marine electronic device mounted to the vessel, the marine electronic device comprising:
a user interface;
a processor; and
a memory including computer program code, the memory and the computer program code configured to, with the processor, cause the marine electronic device to:
generate a sonar image based on the sonar return data received from the one or more sonar transducers at a geographic location, wherein the sonar image is associated with a scale value;
determine the geographic location associated with the sonar return data based on location data received from one or more position sensors at an instance in which the sonar return data was received by the one or more sonar transducers;
present a nautical chart on a display;
receive a user input via the user interface within a portion of the display in which the nautical chart is presented such that the user input corresponds to the geographic location within the nautical chart, wherein the user input indicates a desire to increase a zoom level of the nautical chart to or past the scale value; and
cause, in response to at least one of receiving the user input or changing the zoom level of the nautical chart to or past the scale value, presentation of the sonar image in relative position on the display with respect to the nautical chart, wherein the relative position corresponds to the geographic location within the nautical chart.

20. The system of claim 19, wherein the memory and the computer program code are further configured to, with the processor, cause the marine electronic device to cause presentation of the sonar image in the relative position on the display with respect to the nautical chart by causing presentation of the sonar image as an overlay over the nautical chart at the relative position.

* * * * *